United States Patent [19]
Ow

[11] 3,831,210
[45] Aug. 27, 1974

[54] RETRACTABLE WHEEL ASSEMBLY

[76] Inventor: Gordon Y. W. Ow, 1604 Ihiloa Loop, Honolulu, Hawaii 96821

[22] Filed: Aug. 15, 1973

[21] Appl. No.: 388,492

[52] U.S. Cl............... 9/1 T, 214/506, 267/18, 267/66, 280/43.18, 280/124 F
[51] Int. Cl. ............................................. B63c 13/00
[58] Field of Search........... 9/1 T; 280/43.17, 43.18, 280/43.19, 43.23, 124 R, 124 A, 124 F; 180/22 D, 24.02; 267/18, 31, 66; 214/506

[56] References Cited
UNITED STATES PATENTS
| | | | |
|---|---|---|---|
| 2,719,726 | 10/1955 | Johnston | 280/124 R |
| 2,876,922 | 3/1959 | Holiday | 214/506 |
| 3,779,574 | 12/1963 | Ow | 280/43.18 |

*Primary Examiner*—Robert J. Spar
*Assistant Examiner*—Donald W. Underwood
*Attorney, Agent, or Firm*—Lowe, King and Price

[57] ABSTRACT

A wheel assembly to be mounted on a framework of a vehicle is disclosed wherein the action lever supporting the wheel is pivotally mounted on a fixed pivot, and adjacent to said pivot the base for one end of a leaf spring is integrally connected. The spring forms the main upper structural support of the assembly thereby simplifying the design and providing a controlled or tuned springing action for a smoother ride. The second end of the leaf spring is attached to a pivotal link that is supported on a pivot pin carried on a supplemental upper support arm, said arm extending generally parallel to the spring. The pivot pin is engaged by a latch to lock the wheel in the ground engaging or traveling position. The latch includes a pivotal yoke and cap latch element mounted on a single bracket on the framework. A reactive means, in the form of a shock absorber, is connected between the pivot pin and the free end of the action lever supporting the wheel. An actuating cylinder is provided to raise and lower the wheel assembly. The latch is automatically released by the initial movement of the actuating cylinder through a release finger when the wheel is retracted.

10 Claims, 7 Drawing Figures

RETRACTABLE WHEEL ASSEMBLY

The present invention relates broadly to amphibious vehicles and the like, and more particularly, to improvements in the retractable wheel assembly for said vehicles.

BACKGROUND OF THE INVENTION

In my previous patent application entitled, "Retractable Wheel Assembly," Ser. No. 217,211, filed Jan. 12, 1972, now issued as U.S. Pat. No. 3,779,574, Jan. 12, 1973, I disclosed and claimed a wheel assembly for an amphibious vehicle that had certain advantages in terms of improved retractability and improved positioning of components for operational advantages. In this prior arrangement, the leaf spring and reactive means are positioned on opposite sides of an action lever, both of which are primarily mounted on a main support arm. This arm is retractable to raise the wheel when the vehicle is converted to the water operation mode or when the chassis is required to be lowered on land. The resultant combination in my prior invention has proven to be successful; however, in the course of refining the arrangement for production, changes have been made that give certain additional advantages and these are now presented as the present invention.

First, the previous arrangement provided a design wherein the leaf spring is mounted below the lever arm and the primary support of the weight of the vehicle is thus on the static upper arm. Secondly, while a good springing action was attained before, it has been found that with a change in interconnection of the components as in the present invention, decidedly greater advantages could be attained in terms of a controlled or tuned springing action and also in terms of a higher load capacity with the same size of components. In addition, these advantages are gained while making the wheel assembly in a still more compact package.

OBJECTIVES OF THE INVENTION

Thus, it is a main object of the present invention to provide a retractable wheel assembly for use on recreational vehicles characterized by simplified design, improved ride capability and higher load capacity.

It is another object of the present invention to provide a retractable wheel assembly having a compact arrangement of parts while still obtaining the improved design advantages and increased operating capabilities.

It is still another object of the present invention to provide a wheel assembly having a spring system wherein the springing action is transferred directly to the action lever supporting the wheel.

It is still another object of the present invention to provide a retractable wheel assembly having a positively operating latch for locking the wheel in the ground engaging or traveling position, and which latch is automatically operated by the movement of the actuating cylinder.

BRIEF DESCRIPTION OF THE INVENTION

The present invention is directed to a specific interrelationship of parts forming a retractable wheel assembly. In the inventive combination, a fixed or stationary pivot or spindle means is provided on the framework of a vehicle and to this spindle is attached an integrally combined action lever and elongated leaf spring means. The interconnection is preferably attained by forming the action lever as a single piece with the mounting block for the spring. With this arrangement, the support of the weight of the vehicle is on the spring that thus forms the main upper support of the assembly. Since the action lever and spring are essentially one piece, movement of the action lever is working in concert and thus "in tune" with the springing action of the spring means rather than working separately therefrom.

A support arm assembly is pivotally mounted on the fixed spindle at one end for independent horizontal pivoting movement. This support arm assembly extends generally parallel to the spring means and the adjacent "free" ends of the arms are interconnected by a pivot pin to which is attached a pivotal link. This pivotal link allows the axial oscillating movement of the spring as it is flexed in response to the load. Locking means in the form of a pivotal yoke and a pivotal latch cooperate with the pivot pin. Reactive means in the form of a shock absorber is connected between the pivot pin and the end of the action lever mounting the wheel.

A cylinder actuator connected to the free end of the support arm assembly serves to retract the wheel when desired. A guide pin carried by the end of the piston rod of the actuating cylinder is permitted to slide along a slot in the support arm, and this movement allows tripping of the latch through a release finger in response to the initial retracting movement of the piston rod.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
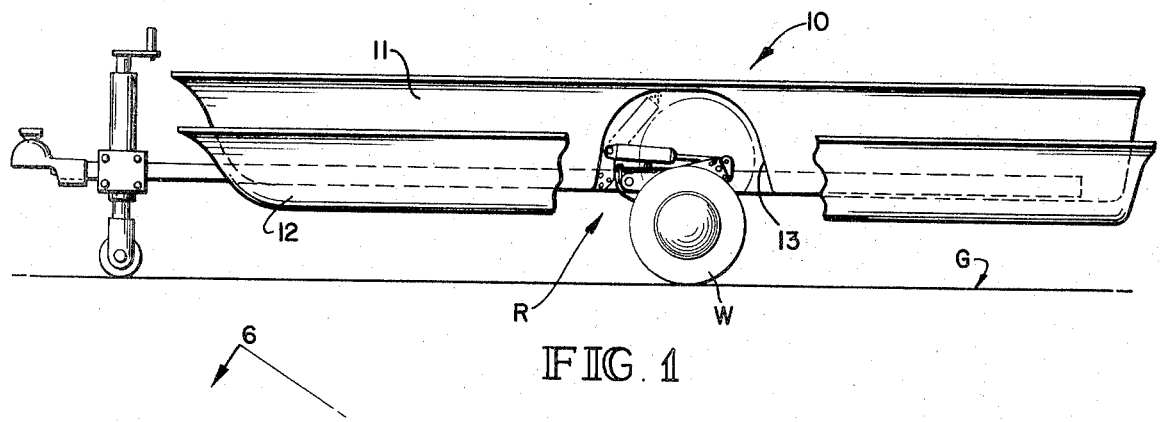
FIG. 1 is a side view with parts broken away showing an amphibious vehicle incorporating the retractable wheel assembly of the present invention with parts broken away for clarity.

Referencing now FIG. 1 of the drawings, there is shown therein an amphibious vehicle, generally designated by the reference numeral 10, with a retractable wheel assembly R mounted on said vehicle. The vehicle 10 may include a hull 11 and lateral support pontoons 12, such as disclosed in my earlier application designated above. The wheel assembly R is preferably mounted in a side depression 13 formed in the hull 11. Wheel W is shown in its full-line ground engaging position in which the vehicle 10 is supported for land travel. The phantom line outline shows the wheel in the retracted position that is utilized when the vehicle 10 is water borne. It should be understood that the improved retractable wheel assembly R is also useful in land vehicles, in which case the retraction would simply lower the chassis of the vehicle into engagement with the ground G.

Figure 2:
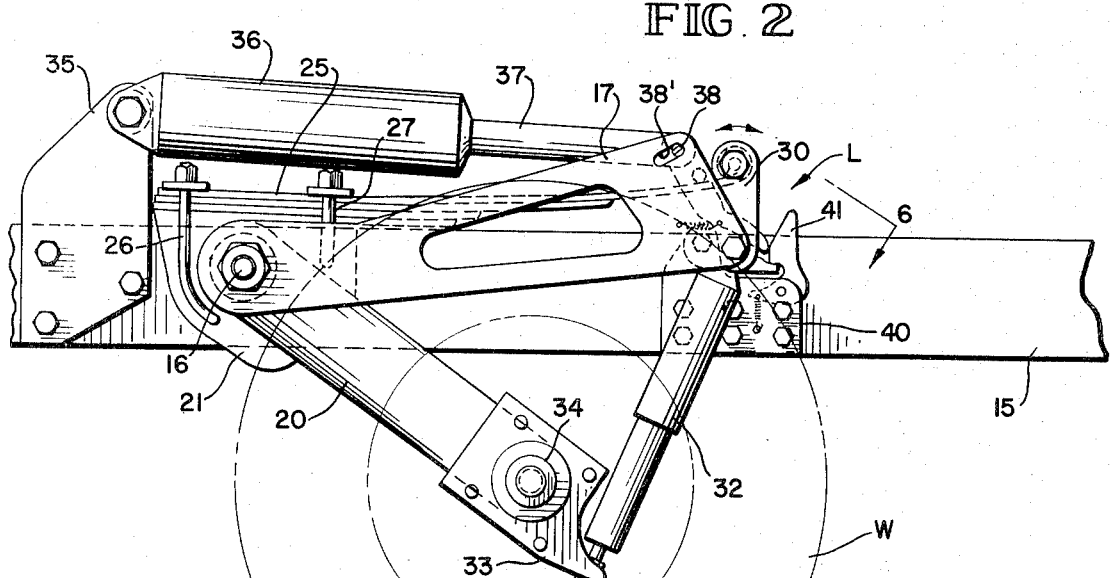
FIG. 2 is an enlarged side view of the retracting mechanism for the wheel, said wheel herein shown in broken lines.

In FIG. 2, the improved retractable wheel assembly R may be seen in more detail and the particular manner of interconnecting parts that forms the concept of the present invention can be described. For clarity, the wheel W is shown in phantom lines in this Figure. First, the vehicle 10 is provided with a framework or chassis 15 from which the overall assembly R is mounted. A horizontal stub spindle or shaft 16 (see also FIGS. 5 and 6) is welded or otherwise suitably affixed to the framework and extends laterally outward therefrom. An outer support arm 17 is mounted at one end to the pivot shaft 16. As can be seen in FIG. 6, the inner arm is substantially a duplicate to the support arm 17 and is designated by reference number 17a, the two arms forming a support arm assembly 17, 17a. The support arm assembly 17, 17a plays an important role in the retracting and locking functions of the wheel assembly R and these will be described fully below.

Positioned within the lateral confines of the support arms 17, 17a is an action lever 20 that is pivotable on shaft 16 independently of the pivoting action of said support arms 17, 17a. The lever 20 is preferably welded (or otherwise integrally attached) to a spring mounting block 21. A retaining nut is provided on the end of the spindle 16 (see FIGS. 2 and 6) to complete this part of the assembly.

On top of the mounting block 21 is provided an elongated leaf spring member 25 having a plurality of leaf members, progressive in length from top to bottom (see FIG. 2). The mounting is accomplished through a suitable pair of special U bolts 26, 27. The spring member 25 thus itself forms the main upper support for the assembly R. In operation, it can be seen that on applying a force F (see FIG. 2) to the wheel W, the action lever 20 is moved depressing the reactive means 32 and, most importantly, directly transmitting the force to the spring 25 by torsional action about the spindle 16. It is important to notice that the force to the spring comes only through the action lever 20 so that the flexure of the spring 25 as well as the incidental flexure of the action lever 20 work in concert or "in tune." In other words, the pivoting of the lever 20 in the counter clockwise direction around the pivot means 16, flexes the spring 25 by a direct twisting of the multilayered portion of said spring. Because of this direct transmittal of force to the widest and strongest members in the combination and because the load is partially supported directly on the pivot stub shaft 16, the wheel assembly R is capable of supporting greater loads than the previous assemblies of which I am aware. Furthermore, since the spring means 25 provides springing action directly to the action lever, there is no mushiness or softness, but yet a smooth shock absorbing ride that is superior to the ride attained in past combinations.

Figure 5:
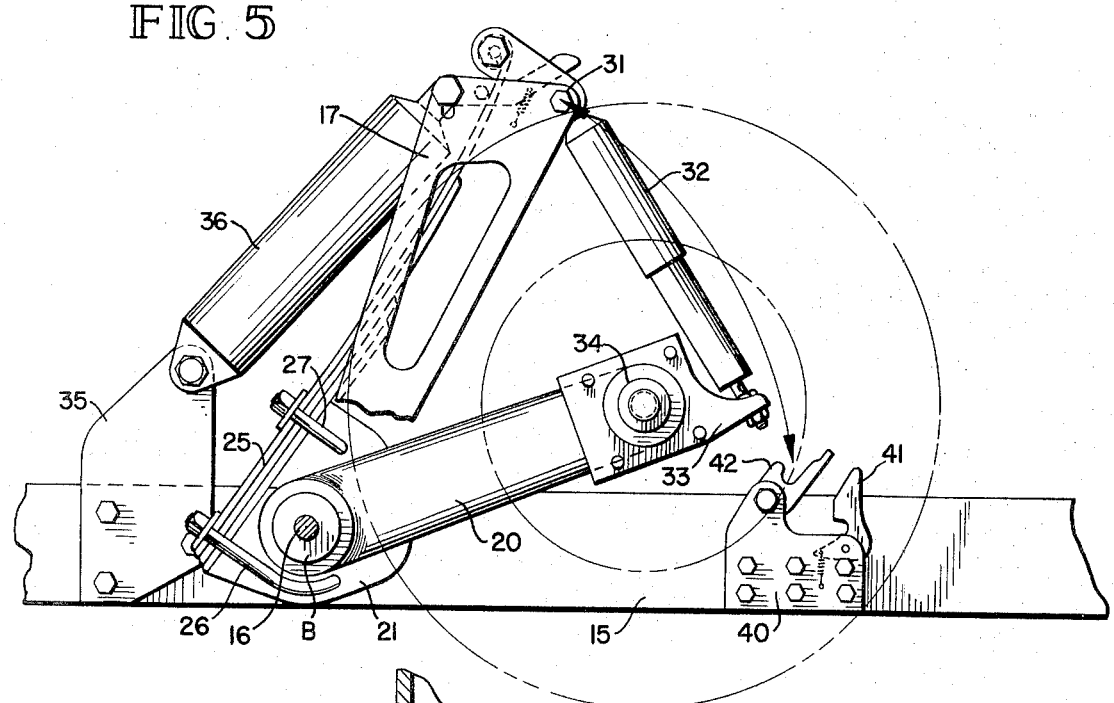
FIG. 5 is an enlarged side view with parts broken away showing the wheel in the fully retracted position, i.e., still further in the retracting sequence.
Figure 6:
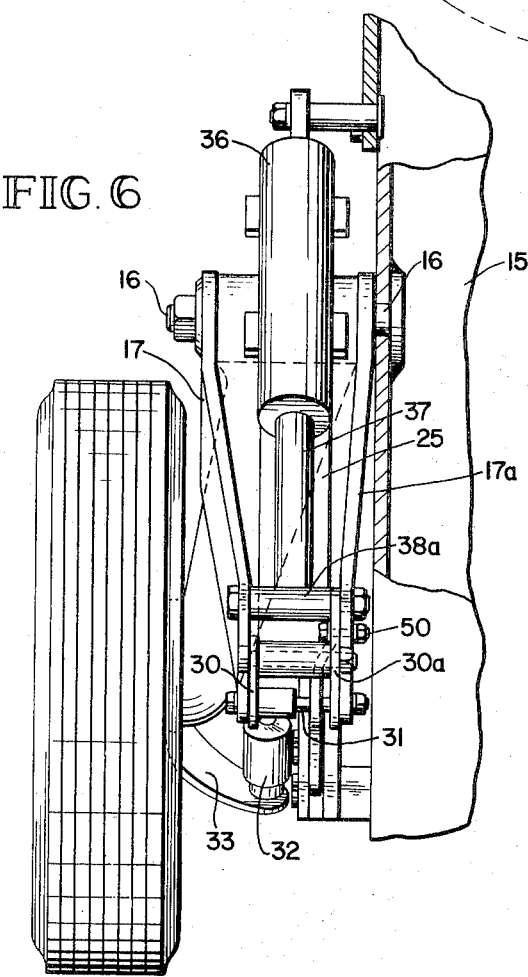
FIG. 6 is a top plan view taken along the sight line 6—6 of FIG. 2 and showing the retracting cylinder and latch assembly in detail from above.

In FIG. 5, the support arm 17 has been broken away specifically to show the integral, single piece construction of the action lever 20 and the mounting block 21. The single piece construction is important to the low cost manufacturing of the assembly of the present invention, i.e., the piece can be integrally fabricated by welding of the two parts together. The U bolts 26, 27 attaching the spring means 25 to the mounting block 21 merely pass through apertures in the block. The integral arm 20 and mounting block 21 are rotatably supported on the pivot means 16 by a suitable bearing B.

Figure 7:
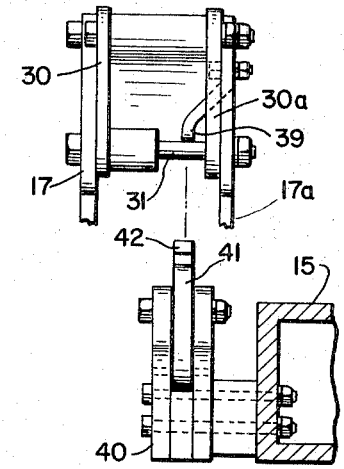
FIG. 7 is a partial view of the latch assembly in conjunction with the movable end of the support arm and spring combination as seen along sight line 7—7 of FIG. 4.

A key secondary factor in allowing a superior springing action is the mounting of the free end of the spring on a pivotal link assembly 30, 30a (see FIG. 7, for example). This link means 30, 30a allows the oscillating movement shown by the action arrow in FIG. 2 as the spring 25 flexes. This assures that the full flexibility of the progressively longer leaf elements is gained during operation of the wheel W. As shown in FIGS. 3 and 4, and FIGS. 6 and 7, the link assembly 30, 30a is carried on pivot pin 31 and this pivot pin is actually a part of a locking or latch means L, that will be described more in detail later. Also carried by the pin 31 is the upper end of reactive means 32 that takes the form of a conventional shock absorber. The other end of the reactive means 32 is connected to a bracket 33 that houses bearing 34 for the wheel W.

From the foregoing, it can now be seen that the force F applied to the wheel W as the vehicle 10 is moved along the ground G, will be transmitted through the action lever 20 and the integral mounting block 21 to the spring means 25. The reactive means 32 is positioned at the point of greatest lever arm from the pivot means 16 and thereby absorbs the shocks of the force F with the greatest efficiency. The spring 25 is mounted in a position above the action lever 20 so that interference with obstacles along the roadway is avoided. The reactive means 32 is protected behind the action lever 20. The pivotal link assembly 30, 30a and the pivot pin 31 uniquely provide the necessary locking for the support arm assembly 17, 17a, oscillatory movement of the free end of the spring means 25 and a mounting point for the reactive means 32.

Just forward of the pivot means or spindle 16 is a support bracket 35 mounting the base of an actuating fluid cylinder 36 having a piston rod 37 (see FIG. 2). The end of the piston rod is fitted with a transverse pin 38 held in guide slot 38' and the companion guide sleeve 38a (FIG. 6). Mounted for operation from the same pin 38 is a pivotal release finger 39 forming a part of the latch means L (see, for example, FIGS. 4 and 7). The raising and lowering function of the actuating cylinder 36 can be seen by comparison of the position of the parts in FIG. 5 and FIG. 2, respectively. In FIG. 5, the piston rod 37 has been withdrawn into the cylinder 36, the support arm assembly 17, 17a is raised and the action lever 20 and wheel W is raised through the connections of the spring 25 and the reactive member 32. The ground engaging or land travel position is shown in FIG. 2 with the support arm 17 moved to the lower position and substantially paralleling the framework 15.

The function of the latch L of holding the support arm 17 in the lower position has already been set forth. The structure of the latch L, which forms an important feature of the present invention, will now be described. Thus, referencing first FIGS. 5 and 7, the framework or chassis 15 is shown to support a bracket 40 and on this bracket 40 is a pivotal cap latch element 41 and an adjacent and cooperating pivotal yoke member 42. The cap latch element 41 is biased in the counter clockwise direction by spring 43, and the previously described release finger 39 is biased in the opposite direction (viewing FIG. 4) by spring 44. The spring 44 under normal conditions keeps the transverse pin 38 in the upper end of the cooperating guide slot 38'.

Figure 3:
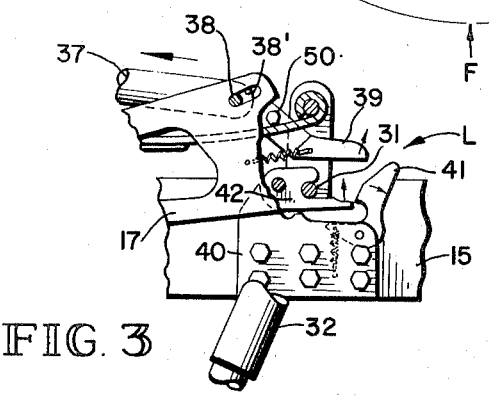
FIG. 3 is a detailed action view showing the latch in the releasing mode in response to actuation of the cylinder.

Thus, considering the operation of the latch L, reference can be made comparing FIG. 2 where the actuating cylinder 36 is extended its full amount and the latch L is held securely in the locked position, to the showing in FIG. 3 where the piston rod 37 has just been shifted to the left by the cylinder 36. The initial shifting action pulls the pin 38 along the guide slot 38' and pivots the release finger counter clockwise about its own pivot bolt assembly 50 fixed on the rear support arm 17a (see FIG. 6, also). The action arrow at the tip of the release finger shows this movement and the resulting camming movement of the cap latch 41 from the position that had existed previously in FIG. 2. The shoulder of the latch element 41 overlying the lower finger of the yoke 42 is released, allowing the lower finger to move upwardly, as also shown by the action arrow in FIG. 3.

Figure 4:
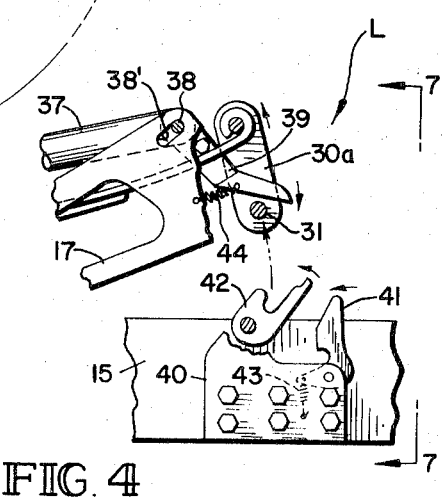
FIG. 4 is a partial view like that of FIG. 3 showing the latch means in an action mode immediately after the action of FIG. 3.

Continued retracting movement of the piston 37 into the cylinder 36 raises the support arm assembly 17, 17a to the position shown in FIG. 4. The yoke 42 has been rotated so as to complete the release of the pivot pin 31, and the cap latch element 41 has rotated back by spring action to its original position. Once the pin 31 has cleared the capture relationship of the yoke 42, the spring 44 is sufficiently strong to return the transverse connecting pin 38 to the upper portion of the guide slot 38'. Now the piston rod 37 continues to retract into the cylinder 36 until the fully retracted position of FIG. 5 is reached.

Now assuming that the wheel W is to again be lowered, such as when the amphibious vehicle 10 is to be converted to land operation, the cylinder 36 is provided with pressurized fluid from the control means (not shown) to move the piston rod 37 toward the extended position. The pivot pin 31 moves along the path of the arrow (FIG. 5) and into the open side of the yoke 42 that is held in the upward position preferably by friction of the two parts of the bracket 40 (see FIG. 7). As the support arm 17 continues to move downwardly, the pin 31 acts against the lower finger of the yoke 42 and turns the same, as can be seen by referral back to FIGS. 3 and 4 of the drawings. As the lower finger moves down, it is adapted to cam the cap latch element 41 outwardly until the latching shoulder finally overlies the same, as shown in FIG. 2. In this position, the support arm assembly 17, 17a is securely positioned until such time as the cylinder 36 is again actuated.

In view of the foregoing descriptive material, it is believed that the improved structure and relationship of parts of this retractable wheel assembly has been made evident. The weight of the vehicle 10 on the wheel W is transferred directly to the spring 25 through the action lever for forming the main support of this retractable wheel assembly. This combination of parts also gives "tuned" or controlled springing action. That is, the action lever 20 and the spring 25 are acting in concert at all times rather than against each other as is possible in other non-integral combinations. The support arm assembly 17, 17a is pivotally mounted on the same spindle 16 as the spring and action lever unit. The pivot pin 31 forms an integral part of the latch L, supports the pivotal link 30 for providing an oscillating connection for the free end of the spring 25 and mounts the upper end of the reactive means 32. The latch means L is advantageously made from a pivotal yoke 42 adapted to be captured by a cap latch element 41 and then automatically released by a release finger 39 during the initial retracting motion of the piston rod 37 of the cylinder 36.

In this disclosure, there is shown and described only the preferred embodiments of the invention, but, as aforementioned, it is to be understood that the invention is capable of use in various other combinations and environment and is capable of changes or modifications within the scope of the inventive concept as expressed herein.

What is claimed is:

1. In a vehicle adapted at least for land operation, the combination including an improved wheel assembly comprising a framework for said vehicle, a support arm pivotally mounted on a fixed pivot means on said framework at one end thereof for movement about a substantially horizontal axis, an action lever also mounted at one end thereof on said pivot means, a wheel rotatably mounted on the other end of said action lever, elongated spring means integrally connected at a first end to said action lever adjacent said pivot means, said spring means providing springing action directly to said action lever, the second end of said spring means extending adjacent the other end of said support arm, a pivotal link mounted on said other end of said support arm for oscillating movement on a pivot pin, locking means on said framework for releasably engaging said support arm to lock the wheel in the ground engaging position, reactive means connected between said support arm and said action lever, and actuating means for raising and lowering said wheel assembly operatively connected between said vehicle framework and said support arm, whereby the weight of said vehicle on said wheel is transferred to said spring means only through said action lever for controlled springing action and said wheel is retractable.

2. The wheel assembly of claim 1 wherein is provided a mounting block for said spring, said action lever being formed as a single piece with said mounting block.

3. The wheel assembly of claim 2, wherein said spring means comprises a multi-leaf spring, the leaves being progressive in length toward said second end of the spring and said first end being mounted on said block.

4. The wheel assembly of claim 1 wherein said reactive means comprises a shock absorber mounted between said pivot pin and the other end of said action lever.

5. The wheel assembly of claim 1 wherein said locking means includes a pivotal yoke mounted on said framework, said yoke being adapted for engagement with said pivot pin on said support arm and for rotation to the capture position by the engaging movement of said pin.

6. The wheel assembly of claim 5 wherein said locking means further includes a latch element to intercept one side of said yoke to hold the same after being rotated to the capture position.

7. The wheel assembly of claim 6 wherein said yoke and said latch element are pivotally mounted on a single bracket fixed to said framework.

8. The wheel assembly of claim 6 wherein said latch element is biased to the holding position, a release finger mounted on said support arm to disengage said latch element and means to activate said release finger.

9. The wheel assembly of claim 8 wherein said actuating means includes a fluid cylinder having an operating piston rod, and said means to activate said finger includes a slot in said support arm, guide pin means on said piston rod held captive in said slot and attached to said finger for movement thereof, the initial retracting movement of said piston rod shifting said guide pin means and thereby said latch element to release said support arm and thereby allow retraction of said wheel upon further movement.

10. The wheel assembly of claim 9 wherein said release finger is biased toward the non-activated position and said latch element is biased toward the activated position.

* * * * *